United States Patent Office 3,270,122
Patented August 30, 1966

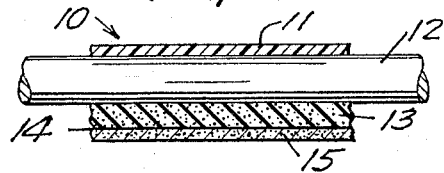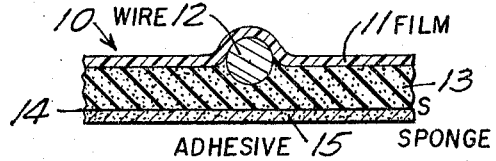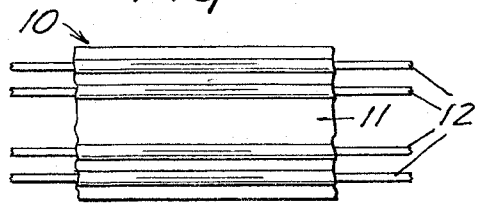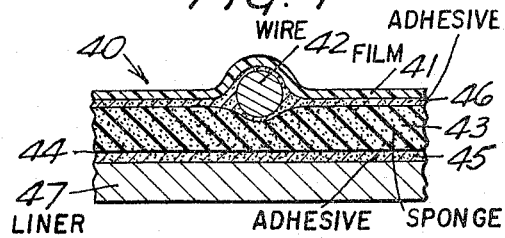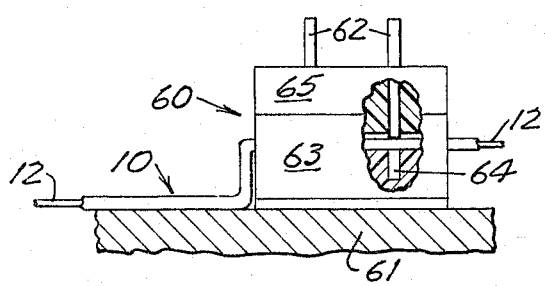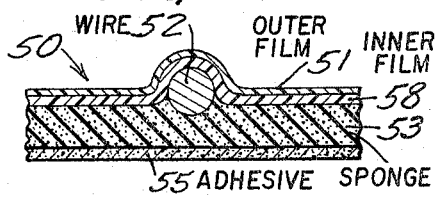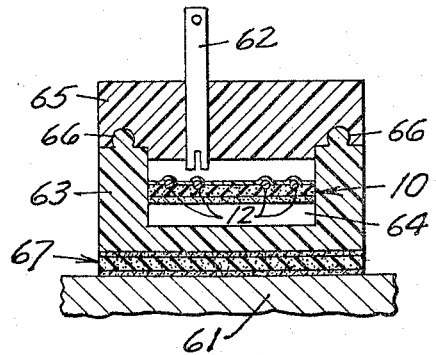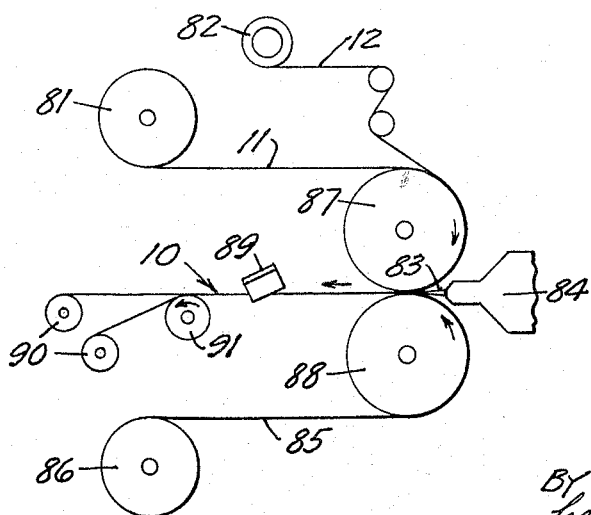

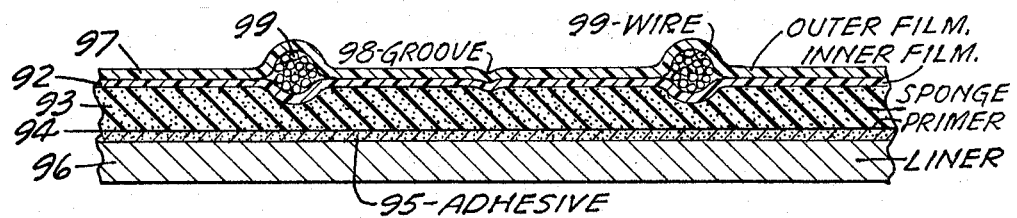

3,270,122
ADHERENT CONDUCTOR
Paul H. Binek, Mendota Heights, Minn., assignor to Minnesota Mining and Manufacturing Company, St. Paul, Minn., a corporation of Delaware
Filed Sept. 24, 1965, Ser. No. 495,015
14 Claims. (Cl. 174—117)

This application is a continuation-in-part of application Serial No. 188,456 filed April 18, 1962, now forfeited.

This invention relates to electrical conductors and connectors, and has particular reference to thin flexible conductor assemblies exemplified by multiple-conductor flat tape-like cables, and connectors for use therewith.

Tape-like flat cables, having a number of parallel small-diameter wires insulated from each other and in side-by-side arrangement within a flat plastic tape or insulating strip, are useful in the interconnecting of components in electronic apparaus, in communication systems, and for other purposes. Where the cables are exposed to view it is usually necessary that they be firmly held in place on a supporting surface, to avoid accidental breakage, or for esthetic or other reasons. Tacks or nails or similar fastening means are to be avoided since if driven through the cable they might sooner or later result in electrical contact with or between conductors; and they cannot be applied effectively to plaster, stone, or metal surfaces. Attempts have therefore been made to attach such cables to baseboard, wall, cabinet and other surfaces by means of adhesives, and particularly normally tacky and pressure-sensitive tape adhesives. The roughness or unevenness of the wall surface, combined with the stiffness, resiliency and bulk of the cable or connector, has heretofore prevented the effective use of such techniques. The unavoidably localized nature of the removal stresses developed, when applied to the strongly adherent and coherent but necessarily extensible pressure-sensitive adhesive layers are employed in an effect to obtain con-failure of the adhesive and loosening or removal of the flat cable. The effect is intensified where thicker adhesive layers are employed in an offort to obtain conformity between the flat cable and rough plaster or other surfaces.

The present invention overcomes these defects and deficiencies, to supply a flat cable and connector product which may be adherently attached to wood, stone, plaster, glass, metal and various other structural surfaces and which then remains permanently affixed thereto under all normal use conditions. The invention has been applied, for example, to the installation of "intercom" systems between office locations. The multi-conductor cable is adhered directly to walls, baseboards, door and window frames, and other structural surfaces. Connections to the cable at points of use are likewise made with connectors which are adhered directly to the same surfaces. Despite the irregularities of surface and the normal rigidity and bulk of the cable and connectors, the system remains firmly bonded even at areas of severe stress such as around corners, over joints in brick or block walls, at doorways, near desks or other inter-connection points and particularly to rough plaster walls.

It has now been found that very thin coatings of desirably strongly tacky and eucohesive pressure-sensitive adhesives are capable of adherently permanently affixing thin multi-wire flat cables and connectors to any of a variety of surfaces when the unitary cable or connector structure includes an intermediate thin light-weight and compressible layer of tough resilient flexible resinous foam, as will now be further described and illustrated in connection with the appended drawing, in which:

FIGURES 1, 2 and 3 are respectively sectional side elevation, sectional end elevation, and top plan view of portions of a preferred flat cable;

FIGURES 4 and 5 are sectional end elevations of portions of alternative flat cable structures;

FIGURE 6 is a side elevation, partly in section, and FIGURE 7 a corresponding sectional end elevation, of a portion of a typical installation showing a connector in position for connection to a conductor of a flat cable;

FIGURE 8 diagrammatically illustrates a process and apparatus as employed in making the flat cable of FIGURES 1–3; and FIGURE 9 is a sectional end elevation of a portion of another form of flat cable.

The cable segment 10 of FIGURES 1 and 2, shown greatly enlarged, comprises a thin flexible plastic film 11, a metal wire 12, a flexible plastic sponge or foam portion 13, an (optional) adhesive primer coating 14, and a thin coating of highly coherent normally tacky and pressure-sensitive adhesive 15. The wire 12 is in firm contact with the film 11 and is otherwise surrounded by the plastic foam 13, which is formed integrally with the film 11. As further shown in FIGURE 3, a typical preferred form of cable contains a total of four wires 12, i.e. two pairs of conductors, in parallel spaced side-by-side position.

The adherent cable 40 of FIGURE 4 includes a coating 46 of adhesive bonding together into a unitary structure the plastic film 41, the conductor 42, and the foam layer 43. An outer layer 45 of pressure-sensitive adhesive is protected by a removable temporary liner 47. An adhesive priming layer 44 may be included for improved bonding between foam and pressure-sensitive adhesive, or may be omitted where the latter itself provides sufficient bond strength.

FIGURE 5 illustrates another modification in which the flat cable 50 comprises a unitary two-layer film having a tough abrasion-resistant outer layer 51 and an inner bonding layer 58. A foam layer 53 covers the conductor 52 and is bonded to the inner layer 58, and a normally tacky pressure-sensitive adhesive layer 55 is bonded to the outer surface of the foam layer.

In FIGURES 6 and 7 the flat cable 10 and the connector block 60 are adherently bonded to the surface of a supporting substrate 61 which for example may be a plaster, stone, concrete block, wood or metal wall. Electrical connection to individual conductors 12 of the cable is made through deeply slotted resilient connector elements 62 slidably passing through the cap 65 and the terminal prongs of which penetrate the cable 10 and make permanent positive electrical connection with the conductor when forced into connective position. The cable adheres to the supporting floor of the longitudinally channeled base member 63 and the pointed or rounded prongs of the slotted end sections of the connectors 62 pass into transverse slots 64 in said floor. The cap 65 and base 63 are composed of tough and hard but resiliently deformable plastic insulation material and are interconnected, after insertion of the cable 10, by snap fit means here illustrated as tongue-and-groove connections 66. The connector block is firmly held to the surface of the substrate 61 by an intervening segment of pressure-sensitive adhesive tape or sheet material 67 comprising an inner thin tough resilient foam layer between two high strength thin normally tacky and pressure-sensitive adhesive layers. For this purpose, use can be made of the double-coated foam-layer pressure-sensitive adhesive tapes described in the copending application of Engdahl and Buchholtz, Serial No. 188,479, filed April 18, 1962.

Although the conductors are spaced as accurately as possible within the cable, and the connector is also accurately dimensioned, it is generally found that some slight lateral movement of one or more of the wires is experienced during application of the connector elements 62. The cable structure of FIGURE 4 is particularly effective in permitting substantial lateral displacement of the wires by the connectors, due to the presence of the surrounding yieldable adhesive layer 46. However the structure requires additional manufacturing steps and has other disadvantages as compared with the cable illustrated in FIGURE 2.

Similarly, the structure of FIGURE 5, while providing improved resistance to abrasion through the presence of the resistant outer layer 51 as well as desirable displaceability of the wires through the inclusion of the softer thermoplastic inner film 58, likewise requires an additional and critical bonding operation in combining the two films into a unitary web; and the web thus produced is found to be less readily deformed into permanent close contact with the wires than is the single-layer film of the structure of FIGURE 2.

In the preferred structure illustrated in FIGURE 2, the resilient porous foam 13 is bonded directly to the single layer film 11 to provide a flat cable which permits slight displacement of the intervening wires without opening up any significant longitudinal channels, which has entirely adequate resistance to abrasion such as might be encountered under any normal and many abnormal usages, which retains its unitary structure under severe strain, and which is capable of being produced by a single simplified combining operation subsequently to be more specifically described.

The tape-like flat cable of this invention will normally be supplied in long lengths of uniform longitudinal thickness, convolutely wound on itself into roll or disc form. For this purpose the exposed pressure-sensitive adhesive surface is desirably temporarily protected with a readily removable liner as illustrated in FIGURE 4. The liner is useful also in protecting the adhesive surface while the cable is fitted to the job, drawn through openings in plaster walls, or otherwise exposed to dust and dirt and to contact with various surfaces prior to installation. The liner is then removed during or just prior to final installation of the cable. The liner also performs an important function during manufacture of the cable, as will be pointed out. However the adhesive surface may alternatively be protected, at least during storage and shipment of the cable, by applying to the exposed film surface a suitable low adhesion backsize and winding the thus treated cable into roll form with the adhesive of each convolute layer in direct contact with the backsized film surface of the next adjacent layer.

The cable of FIGURES 1-3 is conveniently assembled as indicated in FIGURE 8. The thin plastic film 11 from supply roll 81 passes around a driven rigid metallic squeeze roll 87 having a series of shallow peripheral wire-guiding grooves. Wires 12 from a plurality of supply reels 82 press the film into the corresponding grooves. Adhesive-coated temporary liner 85 from supply drum 86 is meanwhile drawn around the opposing elastically compressible hard rubber squeeze roll 88. A sponge-forming composition is extruded from extruder 84 as a thin continuous web 83 directly into the nip area of squeeze rolls 87 and 88 and between the wires 12 and film 11 on the one side and the adhesive-coated surface of the coated carrier 85 on the other. Under the action of the extruder and the squeeze rolls, the hot sponge composition is expanded into cellular form, drawn out to desired thickness, and bonded to the contacting surfaces. The product is withdrawn from the pressure area by pull drum 91, cooled, slit into desired widths at cutter 89, and wound into stock rolls 90.

Essentially the same process is conveniently employed in assembling the cable of FIGURE 9, with the exception that the inner film layer 92 is extruded and the sponge layer 93 is pre-formed over the primer layer 94 and adhesive layer 95 on the treated paper carrier 96, and the outer film 97 is optionally depressed to form a channel or groove 98 midway between adjacent stranded copper conductors 99. The high temperature of the extruded film 92 is sufficient to weld the entire structure together under the pressure of the squeeze rolls. The sponge is produced by application, with a spreader bar or knife coater, of a sponge-forming plastisol composition in liquid form onto the primed adhesive layer on the carrier, followed by heating to cause gelation and blowing.

The flat cable is prepared for use by cutting to the desired length and stripping the protective liner from the pressure-sensitive adhesive surface. A typical liner consists of heavy kraft paper treated with a low-adhesion composition which is inert toward the adhesive. Silicone-treated paper liners are particularly effective. Polymeric films such as polyalkylene or polyester films are also useful although somewhat less easily handled than the relatively stiff paper web. The addition of a suitable thermoplastic primer coating over the exposed surface of the pressure-sensitive adhesive coating in many cases improves the ultimate bond obtained at elevated temperatures between adhesive and resilient sponge, and also reduces the adhesion at room temperature between the adhesive layer and the back surface of the treated paper liner so that the strip 85 may be more easily unwound from the supply roll 86; but in many cases the primer coating may be omitted.

In order that the flat cable product may not delaminate under stresses normally applied, it has been found desirable to employ substantially identical or otherwise well-matched compositions for the film and sponge components, to provide a sponge structure of small pore size and high uniformity, and to combine the two under conditions leading to essentially maximum bonding strength. As an example, it is found highly desirable to combine a vinyl polymer film with a vinyl polymer sponge, or a polyethylene film with polyethylene sponge, the film and sponge in each instance being of the same or nearly the same composition and having closely comparable flexibility and tensile strength properties. Although sheets of resilient foam may be produced in a number of ways, simultaneous extrusion and expansion is found to result in an extremely uniform foam or sponge having very small voids and represents a preferred procedure. Promptly contacting the freshly formed foam with the pre-formed film under pressure and at elevated temperature is found to cause the two to bond together into an essentially continuous unitary structure. Placing the adhesive layer in prompt pressure contact with the simultaneously extruded and expanded foam is likewise found to provide unexpectedly high laminar bond strength. As a result the flat cable of this invention adheres strongly to most structural surfaces and is not loosened, removed, or caused to delaminate under bumping, rubbing, casual stripping, or other stresses normally encountered. Nevertheless it is found possible, when desired to remove the cable without difficulty by sharply jerking or otherwise abruptly applying sufficient stripping stress to disrupt or cleave the multi-layer structure and then by rubbing the residual adhesive layer, with any remaining portion of the foam layer, from the wall surface in much the same manner as in erasing a pencil mark from paper.

The practice of the invention will now be further described in terms of specific illustrative but non-limitative examples in which all proportions are given in parts by weight unless otherwise indicated.

Example 1

A thin vinyl resin film is first prepared by extruding to a nominal thickness of 4½ mils (.0045 inch) a mixture of:

| | Parts by weight |
|---|---|
| Vinyl resin | 100 |
| Resinous plasticizer A | 30 |
| Liquid plasticizer | 15 |
| Dibasic lead phosphite | 2.5 |
| Basic silicate of white lead | 1.0 |
| Dibasic lead stearate | 0.25 |
| Antimony oxide | 4.0 |
| Carbon black | 0.08 |

The vinyl resin is a copolymer of 97 parts of vinyl chloride and 3 parts of vinyl acetate, available as Vinylite "VYNW"; copolymers with up to 10% of vinyl acetate are equally effective. Another equally effective resin is "PVC 133–4" extrusion grade polyvinyl resin. Resinous plasticizer A is a mixed polyester of 1,4-butanediol, 1,2-propylene glycol, adipic acid, and lauric acid having a number of average molecular weight of about 1200 and an acid number of about 5. The liquid plasticizer is dioctyl phthalate. Other plasticizer material which imparts equivalent elasticity, resiliency, flexibility and homogeneity to the film product may replace these exemplary materials. The remaining materials or equivalents thereof are optionally employed, in small amounts as indicated, for stabilizing, lubricating, flame proofing, coloring and otherwise appropriately modifying the film composition.

Separately, a carrier sheet in the form of a commercially available silicone treated kraft paper liner or slipsheet is coated with an adhesive composition, and dried, followed by coating with an adhesive primer composition and again drying, to provide a readily removable film of normally tacky and pressure-sensitive tape adhesive. The adhesive composition consists of:

| | Parts by weight |
|---|---|
| Rubber (smoked sheet) | 50 |
| Rubbery butadiene-styrene copolymer | 50 |
| Terpene Resin Tackifier ("Piccolite S–135") | 90 |
| Phenol-aldehyde resin curing agent | 12 |
| Antioxidant (di-t-amyl hydroquinone) | 2 |
| Zinc oxide | 10 |
| Calcium carbonate | 50 |
| Carbon black | 10 |
| Commercial heptane | 500 |

The primer composition consists of a mixture of natural rubber latex, synthetic latex or rubbery acrylonitrile butadiene copolymer, and water-soluble non-ionic organic wetting agent. The ratio of natural rubber to synthetic rubber is about 3:2, although ratios of 1:1 or even 1:2 are also effective. The wetting agent is added to the extent of about 8% of the total rubber content. The weight of dry adhesive is about 3.5 grams per square foot, and of dry primer about .1–.3 gram per square foot.

A vinyl foam or sponge composition is prepared for extrusion by mixing together in a heavy duty ribbon blender the following materials:

| | Parts by weight |
|---|---|
| Vinyl resin ("VYNW" or "PVC 133–4") | 100 |
| Resinous plasticizer B | 37 |
| Resinous plasticizer A | 5 |
| Liquid plasticizer | 12 |
| Dibasic lead phosphite | 2.5 |
| Basic silicate of white lead | 1.0 |
| Dibasic lead stearate | 0.5 |
| Antimony oxide | 4.0 |
| Azo dicarbonamide | 2.0 |
| Carbon black | 0.08 |

Resinous plasticizer B is a mixed polyester of 1,4-butanediol, 1,2-propylene glycol, adipic acid, lauric acid and isophthalic acid having a number average molecular weight of about 1200 and an acid number of about 5.

It will be seen that the foam-forming composition, aside from the presence of the azo dicarbonamide component, is very similar to the composition of the vinyl film component.

The vinyl film is fed to and around the circumferentially scored rigid drive drum 87 of the apparatus of FIGURE 8 under slight tension, and a plurality of No. 26 B&S gage soft bare solid copper wires are led around the film and roll at the score grooves, as shown. The adhesive-coated carrier web is likewise fed around the compressible resilient roller 88 with the adhesive surface facing drum 87. The previously well-blended vinyl foam composition is fed to a screw type extruder having a long, narrow, doubly slightly concave slot-like orifice opening measuring 10 mils across the center of the slot, and is extruded as a continuous web directly to the nip of the squeeze rolls and between the film and the adhesive layers. Mechanical working of the blend within the heated extruder raises the temperature to within the range of about 320–350° F. and causes decomposition of the azo dicarbonamide and liberation of gas. The gas is dispersed throughout the plastic mass in the form of very small disconnected bubbles which momentarily expand rapidly and cause an expansion of the extrusion to a thickness of about 40 mils as it issues from the extruder. The expansion results in bursting of bubbles at or near the surface of the sheet, but rapid cooling soon hardens the surface so that the bubbles within the interior of the sheet undergo no further change. As the expanded web of vinyl foam is drawn between the adhesive surface of the coated carrier 85 and the wires 12 and film 11, the surface speed of the squeeze rolls 87 and 88 is controlled so as to cause attenuation of the web to a reduced thickness of about 16 mils. The pressure supplied by the rolls is sufficient to cause the formation at the elevated temperature of a strong adhesive or cohesive bond between the hot expanded cellular web or sponge and the vinyl film and primed adhesive. The sponge also holds the wires in position within the grooves formed in the film.

The temperature of the system within the pressure area between the rollers 87 and 88 is carefully controlled to produce maximum bonding between the vinyl resin film and sponge layers while still providing a smooth uniform product. Control is most easily accomplished by regulation of the sponge temperature at the extruder and permitting equilibrium conditions to obtain at the pressure rolls. Simple control tests have been developed. Narrow segments of the composite product, periodically taken for example from the edge of the web which extends beyond the outermost pair of wires, are stretched by hand pulling to approximately a 50% extension and examined for evidence of delamination, which if present indicates a need for an increase in laminating temperature. Evidence of "lipping" or buildup of resin residue along the edges of the extrusion orifice, resulting in the presence of occasional nibs or lumps within the cable, conversely indicates an undesirably high temperature.

If desired, the sponge may be formed between the vinyl film on the one side and the treated but uncoated paper liner on the other side. The sponge and film are firmly united over the entire interface between and beyond the several wires. The liner may be stripped away and adhesive applied, and the liner then re-applied; or the cable may be adhered in place with a subsequently applied adhesive.

Since the adhesive coating has a thickness of approximately 1½ mils, it will be seen that the total thickness of the cable of Example 1 exclusive of the wire is approximately 22 mils. The overall thickness including the wire but excluding the carrier is about 31 mils. The cable is a light gray in color, but may be made in any color desired by addition or substitution of appropriate pigments or coloring agents.

The completed cable, with the carrier sheet still attached may be unwound from the stock roll at the work site, cut to the desired length, drawn through openings or over dust and dirt where necessary, and generally handled as required, without injury. For final installation, the carrier is stripped away and discarded, the freshly exposed adhesive surface then being adhered directly to the clean wall or other substrate where desired. Moderate pressure with a hand roller or with the fingers is sufficient to provide full adhesive contact even on rough surfaces, due to the high bonding strength of the adhesive and the soft resilient compressibility of the foam layer. The cable remains adherently attached under all normal use conditions.

A typical cable produced as just described will carry two pairs of wires, the two wires of each pair being nominally spaced at .080 inch, the adjacent wires of the two pairs being spaced at .250 inch, center to center. Other spacings may be employed, with other wire sizes and for other purposes. The film layer will ordinarily be within the range of three to eight mils in thickness and the foam layer may be from eight or ten mils up to 50 mils thick and in no case thinner than about three-fourths of the wire diameter.

The tensile properties of the vinyl resin compositions shown in the foregoing example are determined for the film and sponge both separately and in the bonded two-layer composite. The free sponge is separately formed between two sheets of the silicone-treated liner paper replacing the vinyl film and the adhesive-coated liner in the process as described. The film and sponge composite is likewise formed on the liner in the absence of the adhesive coating and the wires. Narrow strips of the several webs are tested on the Instron tensile tester using an initial jaw separation of one inch and a jaw separation speed of 12 inches per minute, and under normal room temperature. The cross-sectional dimensions of the initial strip, tensile strength at 10% elongation, tensile strength at break, and elongation at break are determined. The tensile at 10% elongation is particularly significant since, with the wires included, elongation of the completed cable under practical use conditions will rarely if ever exceed 5 to 10%.

| Sample | Dimensions, in. | $T_{10}$, lbs. | $T_B$, lbs. | $E_B$, percent |
| --- | --- | --- | --- | --- |
| Film | .5 x .0042 | 1.5 | 5.2 | 300 |
| Sponge | .5 x .021 | 1.3 | 9.8 | 290 |
| Composite | .5 x .0243 | 2.5 | 18.6 | 305 |

The sponge has about half the density of the film.

*Example 2*

A unitary dual-surface film is first prepared by permanently bonding together a "Mylar" oriented transparent polyester film of 0.5 mil thickness and a transparent polyethylene film of 3 mil thickness. Other suitable composite films may contain 0.5–1.0 mil polyester film and 1 to 5 mil polyalkylene film. Dual-surface films commercially available as "Scotchpak" heat-sealable polyester film are particularly satisfactory.

In order to obtain the desired bond between foam and film there is employed with the dual-surface film a polyethylene foam prepared from commercially available "Alathon" foam-forming polyethylene resin composition.

A silicone resin treated paper serving as a protective carrier web is first provided with a thin dry coating of a pressure-sensitive adhesive composition, consisting essentially of three parts of an adhesive copolymer of iso-octylacrylate and acrylic acid in 95.5:4.5 ratio, and five parts of a rubbery copolymer of three parts butadiene and one part styrene, applied from solution in toluol. Such an adhesive is also highly effective as the adhesive coating in the product of Example 1.

Optionally, a very thin coating of a primer composition is applied over the adhesive layer; it consists of 130 parts of rubbery butadiene-styrene-acrylonitrile terpolymer, 75 parts of hard coumarone-indene resin, and two parts of compatible water-soluble wetting agent, applied as an emulsion or latex from ammoniated water and dried. The primer layer is non-tacky at room temperature but becomes adherent on heating.

The polyethylene foam composition is well mixed and heated to about 350–400° F. in the extruder and is extruded and attenuated between the adhesive-coated carrier and the wire-carrying duplex film in the manner described in Example 1. Particularly with thicker polyester films, some difficulty is experienced in obtaining a sufficiently close fit between the polyethylene surface and the enclosed wires; although the difficulty is decreased by maintaining the drum 87 at an elevated temperature. Since pigmented "Mylar" polyester films are not readily available, the outer portion of the cable is transparent rather than colored to blend with structural surfaces to which applied, and the wires remain visible. However the electrical loss characteristics of the cable are superior to those of the product of Example 1. More particularly, the product is highly abrasion resistant and is well adapted for laying temporary communication lines across floor areas.

Foam or sponge formed by the procedures and from the type of compositions hereinbefore described has been found to bond strongly to film of comparable composition and to high strength pressure-sensitive adhesives. A particular advantage of the in situ extrusion procedure is the ability by such methods to form unusually thin foams of high resiliency and compressibility. Thus, vinyl foam layers not thicker than about 8 to 10 mils are made available for cables carrying wires having a diameter of ten to twelve mils or less, i.e. in the range below approximately No. 26 to No. 28 B&S gage. It is found desirable in these cables to employ foam layers not thinner than about three-fourths of the wire diameter and in no case less than about 8 to 10 mils in order to provide sufficient resiliency and compressibility for smooth application to rough wall surfaces. On the other hand, foams of excessive thickness produce an unsightly appearing cable and one which is less easily applied around sharp corners or inside turns, and hence the foam thickness will ordinarily not exceed about 20 mils when used in communication cables.

Solid wires have been illustrated in the drawing and specified in Examples 1 and 2, and are preferred for use with the connectors hereinbefore described; but stranded conductors as illustrated in FIGURE 9 are equally applicable, and conductors of tubular or other cross-sectional appearance are also useful for many purposes. Other conductive components may be incorporated where desired; for example a thin surface coating of vapor-deposited metal on the outer surface of the film component may be added to serve as a shielding layer. Although not ordinarily required, flexible decorative coatings may be applied, particularly along the exposed cut edges of the individual cables.

An example of materials and procedures useful in preparing an adherent conductive flat cable of the type illustrated in FIGURE 9 will now be given.

*Example 3*

Film composition: Parts by weight
   Vinyl resin of Example 1 _____ 100
   Resinous plasticizer A of Example 1 _____ 50
   Dibasic lead phosphite _____ 2.5
   Basic silicate of white lead _____ 1.0
   Antimony oxide _____ 4.0

Plastisol composition:

| | Parts |
|---|---|
| Polyvinyl chloride, medium mol. wt., low specific viscosity, plastisol grade | 100 |
| Resinous plasticizer A | 100 |
| Dibasic lead phosphite | 2.5 |
| Basic silicate of white lead | 1.0 |
| Animony oxide | 4.0 |
| Azo dicarbonamide | 3.0 |

Adhesive composition:

| | Parts |
|---|---|
| Copolymer of 90 parts isoctyl acrylate and 10 parts acrylic acid | 100 |
| Polyalkyleneimine curing agent | 0.05 |
| Solvent (mixture of methyl acetate toluene) to provide a spreadable composition. | |

Primer composition:

| | Parts |
|---|---|
| Ethyl acrylate | 39.2 |
| Acrylic acid | 1.7 |
| Tertiarybutyl acrylamide | 15.1 |

The terpolymer is formed in aqueous emulsion at a polymer content of about 30%.

Silicone treated paper is first supplied with a thin coating (approximately 4.7 grams/sq. ft., dry weight) of the pre-cured pressure-sensitive adhesive composition and about 1.2 grams/sq. ft. dry weight of the primer composition, and when dry is then further coated with sufficient of the viscous plastisol composition to provide a thickness of 10 to 12 mils of gelled film when first heated, for example at 275° F. for three minutes. The structure is next passed into an oven at 350–375° F. and heated at that temperature for three minutes to cause blowing or sponge formation and curing of the coating. The plastisol composition when separately gelled, blown and cured produces a foam or sponge having a density of between 15 and 20 lbs./cu. ft.

A film is prepared of the film composition by a separate extrusion and stretching process. The extrusion is supplied at about 30 mils but is stretched so that the final film is 12 mils in thickness. It is employed as the outer film in the structure and process as described for FIGURE 9. The required number of No. 22 B&S gage stranded conductors are fed against the film on the circumferentially scored and ridged drum 87 of FIGURE 8. The composite of silicone treated paper, adhesive, primer and foam layer is brought around drum 88 with the foam toward the film and conductors, and a further layer of the film composition is fed directly from the extruder between the two layers at the nip of the rolls 87, 88, at elevated temperature and under tension sufficient to reduce the thickness of the extrusion, again to approximately 12 mils. The temperature of the extruded stock is maintained high enough to avoid the formation of visible graininess or striations at the surface of the extruded film and to form a strong adherent bond between the foam surface and the pre-formed film. The pressure of squeeze rolls 87, 88 assists in bond formation and also forces the hot film material into the interstices of the stranded conductors, the latter being firmly encased within the thus formed polymer shell and thus supported on the surface of the foam or sponge. The ridges on the squeeze roll 87 produce the grooves 98 but may be omitted if desired. The grooves in the roll surface hold the conductors in accurate alignment.

The web is then cooled thoroughly and slit into desired widths along the appropriate grooves, and the strips of flat adherent cable wound into rolls for distribution and use.

What is claimed is as follows:

1. A thin narrow elongate adherent conductive longitudinally uniform flat cable capable of being permanently adherently affixed to structural surfaces and comprising at least one elongate conductor member supported on a major surface of a thin tough resilient compressible sponge layer and covered by a thin tough flexible plastic film firmly bonded to said sponge, and a strongly adherent and eucohesive normally tacky and pressure-sensitive adhesive layer on the other major surface of said sponge layer.

2. A longitudinally uniform flat cable for use in the installation of electrical circuits on structural surfaces and comprising a plurality of wire conductors supported in spaced side-by-side parallel relationship on a major surface of a thin tough resilient compressible sponge layer of a thickness not less than about 8 mils and at least equal to about three-fourths the diameter of said wire conductors, a thin tough flexible plastic film covering said conductors and firmly bonded to said sponge surface, and a strongly adherent and eucohesive normally tacky and pressure-sensitive adhesive layer on the other major surface of said sponge layer.

3. A longitudinally uniform flat cable comprising a plurality of small wire conductors encased in spaced side-by-side parallel relationship between a thin tough resilient compressible sponge layer of a thickness between about 8 and about 50 mils and a thin tough flexible plastic film of a thickness between about 3 and about 8 mils firmly bonded to said sponge layer, and a strongly adherent and eucohesive normally tacky and pressure-sensitive adhesive layer firmly bonded to the opposite surface of said sponge layer.

4. A longitudinally uniform flat cable comprising a plurality of small metal wires encased in spaced side-by-side parallel relationship between a thin tough resilient compressible plasticized vinyl resin sponge layer about 8 to 50 mils thick and at least as thick as about three-fourths the diameter of said wires, and a thin tough flexible plasticized vinyl resin film about 3 to 5 mils thick firmly united with said sponge layer between and beyond said wires; and a strongly adherent and eucohesive normally tacky and pressure-sensitive adhesive layer firmly bonded to the opposite surface of said sponge layer.

5. A longitudinally uniform flat cable comprising a plurality of small metal wires encased in spaced side-by-side parallel relationship between a thin tough resilient compressible uniformly cellular polyalkylene polymer sponge layer about 8 to 50 mils thick and at least as thick as about three-fourths the wire-diameter, and a thin tough flexible film-like covering including a polyethylene layer firmly united with said sponge layer between and beyond said wires; and a strongly adherent and eucohesive normally tacky and pressure-sensitive adhesive layer firmly bonded to the opposite surface of said sponge layer.

6. A longitudinally uniform flat cable comprising a plurality of small metal wires encased in spaced side-by-side parallel relationship between a thin tough resilient compressible polyethylene sponge layer having a uniform fine pore structure and being about 8 to about 50 mils in thickness and at least about three-fourths as thick as said wires, and a thin tough flexible film covering having an outer tough oriented polyester layer about one-quarter to about one mil thick permanently bonded to an inner thermoplastic polyethylene layer about one to about five mils thick and firmly united with said sponge layer between and beyond said wires, and a strongly adherent and eucohesive normally tacky and pressure-sensitive adhesive layer firmly bonded to the opposfte surface of said sponge layer.

7. A longitudinally uniform flat cable structure suitable for handling in roll and strip form during fitting of said cable to installation locations and comprising: a plurality of wire conductors encased in parallel spaced side-by-side relationship between a thin tough flexible plastic film and a thin tough resilient compressible uniformly cellular plastic sponge, said film and sponge being firmly bonded together between and beyond said wires; a strongly adherent and eucohesive normally tacky and pressure-sensitive adhesive layer firmly bonded to the opposite surface of said sponge; and a removable protective liner over the outer surface of said adhesive layer.

8. A longitudinally uniform flat cable structure comprising a plurality of small metal wires encased in spaced side-by-side parallel relationship between a thin tough flexible plastic film and a tough resilient compressible uniformly cellular plastic sponge having a thickness not less than about three-fourths the wire-thickness and between about 8 and about 50 mils, said film and sponge being firmly united together between and beyond said wires.

9. A longitudinally uniform flat cable structure comprising a plurality of small metal wires of No. 20 to No. 40 B&S gage encased in spaced side-by-side parallel relationship between a thin tough flexible plasticized vinyl resin film about 3 to about 8 mils thick and a thin tough resilient compressible uniformly cellular plasticized vinyl resin sponge about 8 to about 50 mils thick and at least about three-fourths as thick as the smallest of said wires, said film and sponge being firmly homogeneously united together between and beyond said wires.

10. A thin narrow elongate adherent conductive integral and longitudinally uniform flat cable capable of being permanently adherently affixed to structural surfaces and comprising in order a first thin tough flexible plastic film, at least one elongate conductor member, a second thin tough flexible plastic film, a thin tough resilient compressible sponge layer, and a strongly adherent and eucohesive normally tacky and pressure-sensitive adhesive layer.

11. A thin elongate adherent conductive integral and longitudinally uniform flat cable capable of being permanently adherently affixed to structural surfaces and comprising in order a first thin tough flexible plasticized vinyl resin film, a plurality of small metal conductors in spaced side-by-side parallel relationship, a second thin tough flexible plasticized vinyl resin film, a thin tough resilient compressible plasticized vinyl resin sponge layer, a primer and barrier layer, and a strongly adherent and eucohesive normally tacky and pressure-sensitive adhesive layer.

12. A longitudinally uniform flat cable for use in the installation of electrical circuits on structural surfaces and comprising a plurality of wire conductors supported in spaced side-by-side parallel relationship on a major surface of a thin tough resilient compressible plasticized vinyl resin sponge layer of a thickness not less than about 8 mils and at at least equal to about three-fourths the diameter of said wire conductors, a thin tough flexible plasticized vinyl resin plastic film covering said conductors and firmly bonded to said sponge surface, and a strongly adherent and eucohesive normally tacky and pressure-sensitive adhesive layer on the other major surface of said sponge layer.

13. Method of making a flat cable structure comprising: placing a plastic resinous mass containing an expandable vapor uniformly distributed therethrough under high pressure at an elevated temperature; extruding said mass in a thin continuous ribbon into a zone of lower pressure to permit expansion of said ribbon into a uniformly cellular sponge-like structure; attenuating the expanded ribbon to substantially reduced thickness; and pressing the attenuated ribbon against a thin dense plastic film, and around a conductor carried thereby, under a pressure and at a temperature sufficient to produce unifying bonding between said film and said sponge.

14. Method of making an adherent flat cable structure comprising: placing a plastic resinous mass containing an expandable vapor uniformly distributed therethrough under high pressure at an elevated temperature; extruding said mass in a thin continuous ribbon into a cooling zone of lower pressure to permit expansion of said ribbon and formation of a uniformly cellular sponge-like structure; attenuating the expanded ribbon with substantial reduction in thickness; and pressing the attenuated ribbon between a thin dense plastic film and a plurality of parallel side-by-side wires carried thereby, and a layer of normally tacky and pressure-sensitive adhesive carried on a removable temporary liner, under a pressure and at a temperature sufficient to produce unifying bonding between the film, sponge and adhesive layers.

No references cited.

LARAMIE E. ASKIN, *Primary Examiner.*